United States Patent

[11] 3,581,868

| [72] | Inventors | Jack W. French<br>Lake Forest;<br>Richard M. Lewanski, Chicago; Richard E. Modry, Oak Park all of, Ill. |
|---|---|---|
| [21] | Appl. No. | 799,165 |
| [22] | Filed | Feb. 14, 1969 |
| [45] | Patented | June 1, 1971 |
| [73] | Assignee | Sommer & Maca Glass Machinery Company<br>Chicago, Ill. |

[54] CONVEYOR ASSEMBLY
2 Claims, 8 Drawing Figs.

[52] U.S. Cl. ..................................................... 198/33, 198/27, 214/1
[51] Int. Cl. .................................................. B65g 47/24
[50] Field of Search ........................................ 198/20, 21, 27, 33 (R3), 127; 214/1 (B4), 1 (RA), 1 (R7); 51/98.5, 125.5, 137—139; 294/115; 83/154

[56] References Cited

UNITED STATES PATENTS

| 2,104,422 | 1/1938 | Heichert | 198/27X |
| 2,816,793 | 12/1957 | Elberty | 294/115X |
| 3,127,974 | 4/1964 | Kelley | 214/1(RA) |
| 3,129,805 | 4/1964 | Krahn et al. | 198/127 |
| 2,943,749 | 7/1960 | Dotterer et al. | 294/87X |

FOREIGN PATENTS

| 417,785 | 8/1925 | Germany | 214/1(RA) |
| 960,659 | 6/1964 | Great Britain | 214/1(RA) |

*Primary Examiner*—Joseph Wegbreit
*Assistant Examiner*—Bruce H. Stoner, Jr.
*Attorney*—Parker, Carter and Markey

ABSTRACT: Means for transferring a batch of glass plates from a first to a second conveyor, overturning said plates during transfer, and means for operating portions of said conveyors intermittently to convey said plates at varying speeds in a selected direction, the conveying and overturning mechanisms operating in timed sequence.

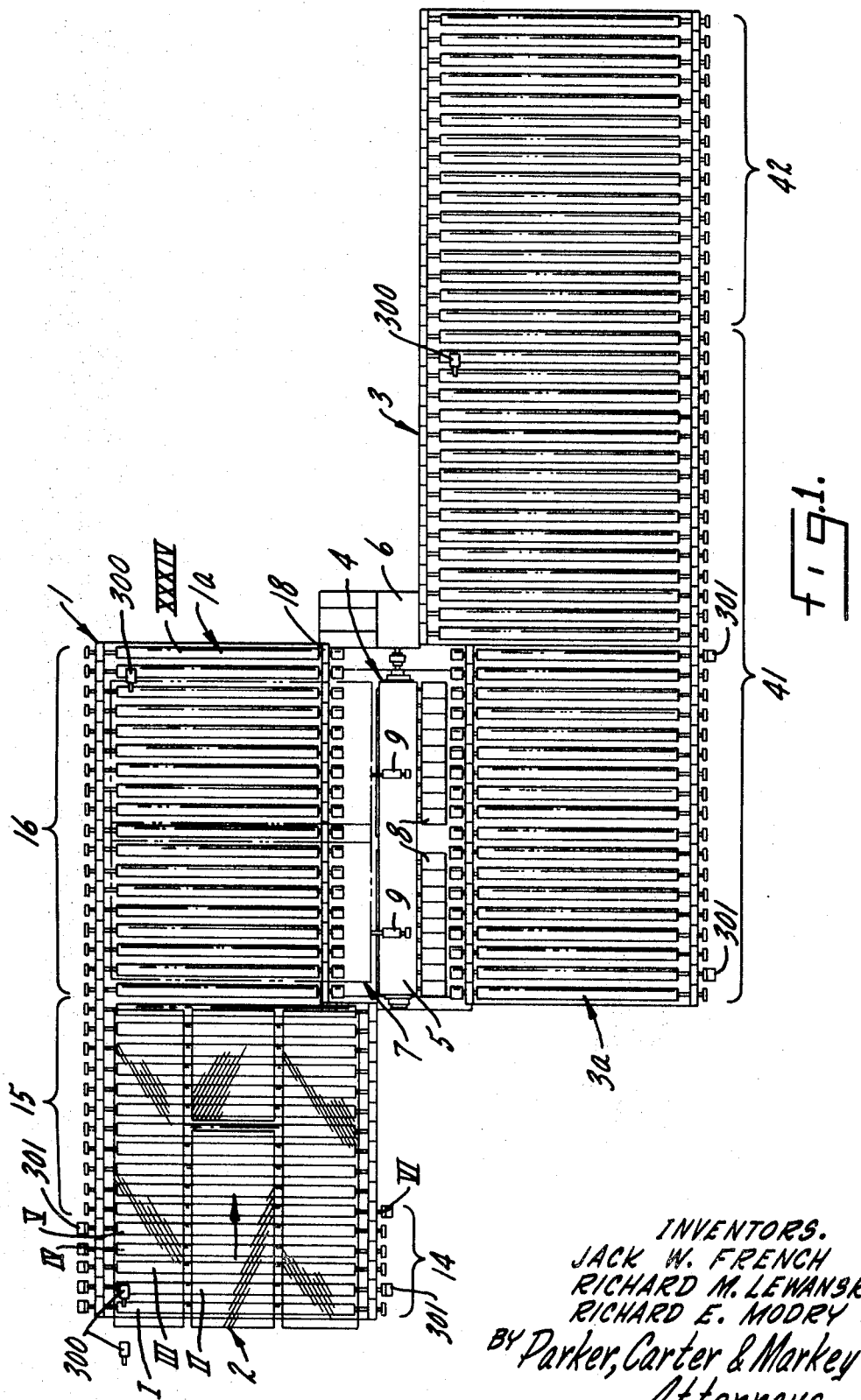

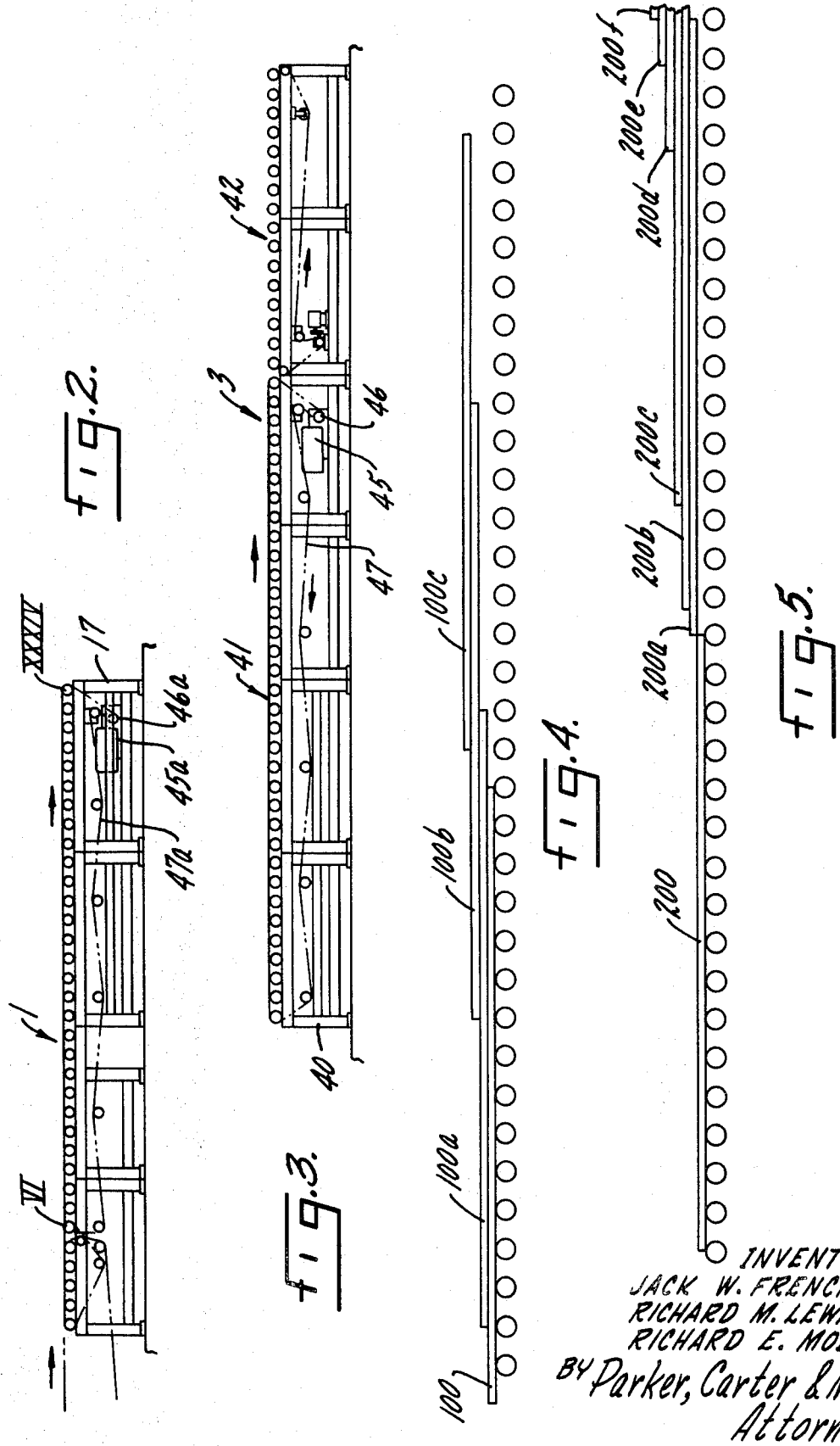

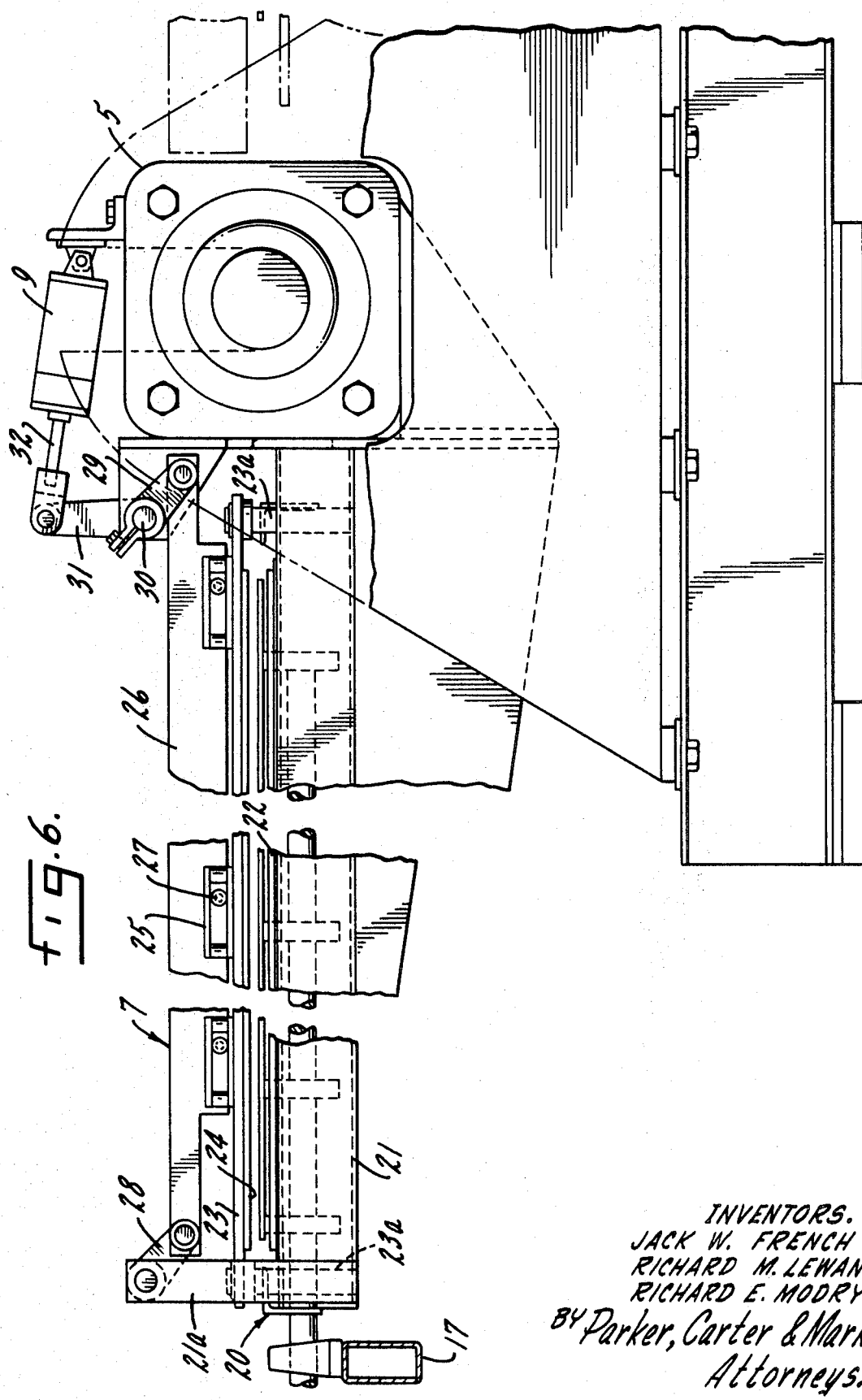

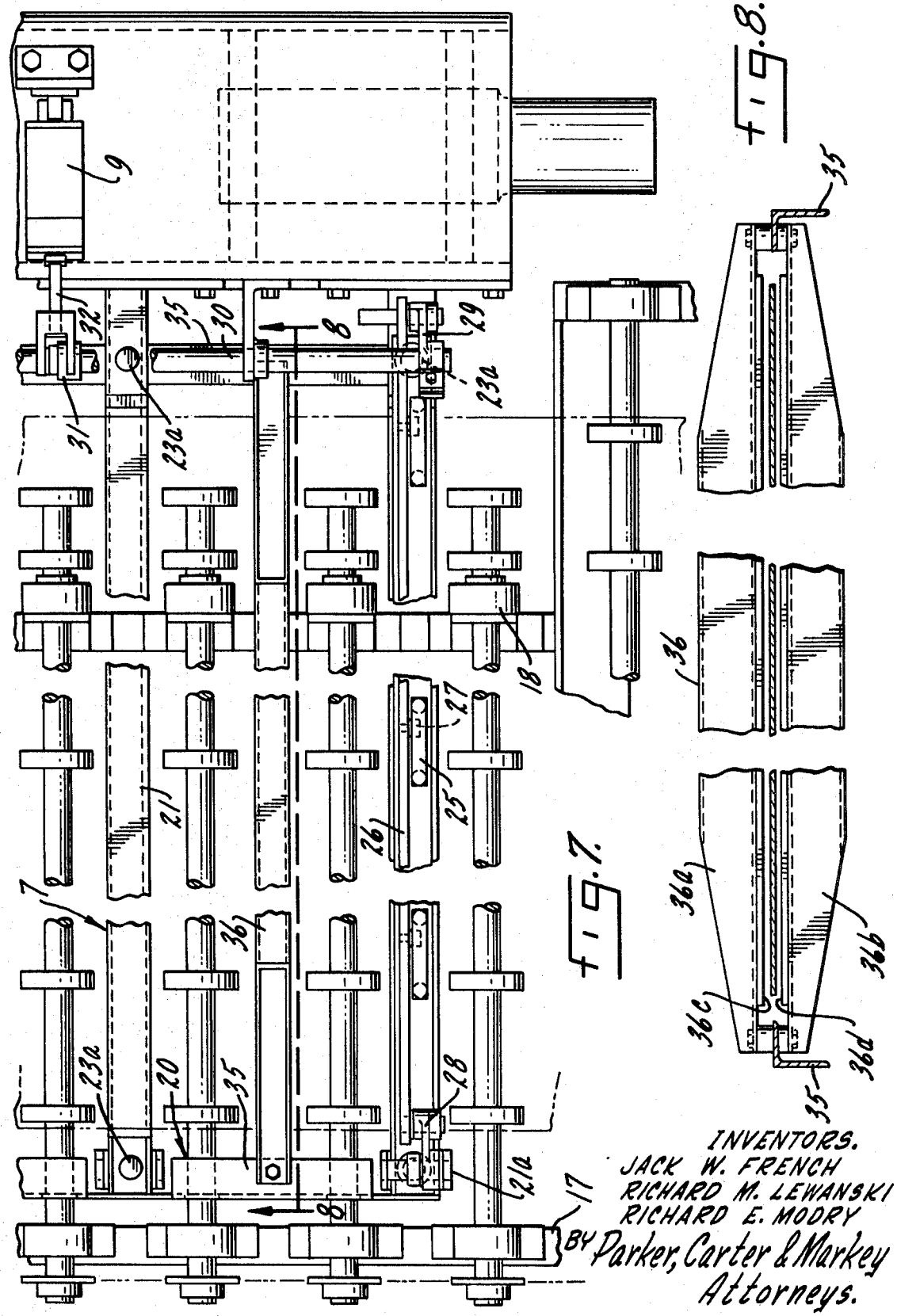

CONVEYOR ASSEMBLY

SUMMARY OF THE INVENTION

Means are provided for automatically, mechanically grasping a group or batch of random-sized plates from both above and below the plates, lifting said batch from a first conveyor, overturning and depositing the same on a second conveyor, the second conveyor having means for moving said batch out of alignment with said transfer-overturning means, the overturning means returning to initial position for reception of a second set or group of plates, both the delivery and receiving conveyors having means for varying the speed and effectiveness of portions thereof in timed sequence and in relation to the position of said transfer-overturning means.

This invention relates to glass machinery and has particular relation to a conveyor assembly effective to convey groups or batches of panellike elements, such as glass plates.

Glass plates may be conveyed through a coating mechanism for deposit of a substance, such as mirror-forming material, paint or the like, and may then be conveyed through drying or oven means, washing stations or the like. Thereafter the batch may require an overturning and conveying, with the upper and lower surfaces of the plate reversed, for further treatment. It is accordingly one purpose of the invention to provide mechanism capable of transferring and overturning a group or batch of relatively random-sized plates together in automatic, timed sequence.

Another purpose is to provide means automatically responsive to the movement of a batch of plates along a conveyor and effective to overturn and transfer said batch to an adjacent conveyor.

Another purpose is to provide adjacent conveyors having timing means automatically responsive to plates being conveyed and effective to vary the speed of said conveyors to permit transfer and overturning of items conveyed thereon from one to the other of said conveyors.

Another purpose is to provide automatic mechanical means for conveying, transferring, overturning and further conveying a batch of panels of varying sizes, widths and lengths.

Another purpose is to provide automatic means for conveying, transferring, overturning and further conveying glass panels at a continuous high rate of production and without damage thereto.

Other purposes will appear from time to time during the course of the specification and claims.

BRIEF DESCRIPTION OF THE DRAWINGS

The invention is illustrated more or less diagrammatically in the accompanying drawings wherein:

FIG. 1 is a top plan view;

FIG. 2 is a side view of a delivery conveyor;

FIG. 3 is a side view of a receiving conveyor;

FIG. 4 is a schematic representation of the action of the conveyor of FIG. 2;

FIG. 5 is a schematic representation of the action of the conveyor of FIG. 3;

FIG. 6 is an end view, with parts broken away, of the transfer mechanism of the invention;

FIG. 7 is a top view of a portion of the transfer mechanism; and

FIG. 8 is a view taken on the line 8—8 of FIG. 7.

Like parts are indicated by like numerals throughout the specification and drawings.

DESCRIPTION OF THE PREFERRED EMBODIMENT

Referring now to the drawings, FIG. 1 discloses a first or delivery conveyor indicated generally by the numeral 1. Under conveyance in the direction of the arrow on conveyor 1 is a group or batch of panels such as the glass panels of varying widths and lengths arranged together in the batch indicated generally by the numeral 2.

It will be understood that the panels within batch 2 may have been subjected to varying treatments prior to their arrival at the transfer station indicated at 1a on conveyor 1. A second or off-line conveyor 3 is shown as paralleling conveyor 1 and with a receiving station 3a adjacent station 1a. Positioned between conveyors 1 and 3 is a transfer mechanism generally indicated by the numeral 4.

While a variety of conveyor mechanisms may be employed, it has been found preferable to employ rollers as shown, the rollers being arranged in specific groups and associated with particular control elements, as further described hereinbelow.

As may be best seen in FIG. 1, transfer mechanism 4 includes generally a turntable segment or drum 5 and means 6 for rotating it about an axis such as the horizontal axis shown. Drum member 5 includes a clamp assembly indicated at 7, which is balanced by the counterweight structure 8. Carried by member 5 are clamp-operating elements such as the air cylinders 9.

Referring now to FIG. 2, it will be observed that conveyor 1 includes upstream groups of rollers indicated generally by the numerals 14,15. Adjacently downstream of group 15 is a second group of rollers at transfer station 1a and indicated by the numerals 16. It will be observed that the roller groups 14,15,16 of conveyor 1 are supported on a frame 17, the rollers of group 16, however, being individually supported on individual stanchions 18, as best seen in FIG. 7.

Referring now to FIGS. 6—8, the clamp member 7 is shown as including a frame 20. Frame 20 includes lower clamp members 21 carrying along their upper surfaces, as the parts are shown in full lines in FIG. 6, the pads 22. Upper clamp members 23 carry along their lower surfaces the pads 24. Each upper clamp member 23 is carried, as by its brackets 25, on a closing arm 26 and members 23 are movable vertically on posts 23a at the opposite ends of members 21 and 23. Rollers 27 are carried by arms 26 for movement within the brackets 25. Each arm 26 is supported on frame 20 as by a pivoted link 28 at one end of each arm 26. Links 28 are pivoted on upstanding frame members 21a secured to clamp member 21. The opposite end of each arm 26 is pivotally supported by a link 29 rotatable with a bar 30 which is in turn secured by link 31 to operating shaft 32 of clamp-operating cylinder 9. Frame 20, as may best be seen in FIG. 7, includes crosspieces 35 and joinder strips 36 between clamp member sets 23,26. As best seen in FIG. 8, joinder strips 36 include spaced upper and lower members 36a,36b carrying opposed pads 36c,36d.

Referring now to FIGS. 1 and 3, it will be observed that a frame 40 supports a plurality of rollers forming conveyor 3. The rollers of conveyor 3 comprise a first group indicated by the numeral 41 and a second group 42 to one side of the group 41, as the parts are shown. It will be understood that, if desired, a third group of rollers may be positioned on the opposite side of group 41 to provide for conveyance of plates received from mechanism 4 in either direction.

The rollers of group 41 are each supported by individual stanchions similar to those shown at 18 in FIG. 7. The rollers of group 42 are supported directly on frame 40. A drive means 45 suitably drives a first sprocket or pulley 46 which, through additional pulleys and endless belt means 47, is effective to operate the rollers of conveyor 3 as described hereinbelow. Similarly, as seen in FIG. 2, drive means 45a, pulleys 46a and endless belt means 47a are suitably provided for driving the groups of rollers forming conveyor 1.

Referring now to FIGS. 4 and 5, it will be observed that the operation of the various roller groups is illustrated schematically by means of glass panels shown at various levels. For example, in FIG. 4 the panel 100, shown on the left-hand group of rollers, indicates the position of the panel or batch of panels as it moves adjacent the transfer station. The panel 100a illustrates the position of panel 100 after a trip switch has affected the speed of the roller groups provided, it being understood that the panel 100 would continue to be supported on the rollers of the conveyor when in the position shown at 100a, as well as at subsequent positions. Indicated at 100b and 100c is the position of the handle or batch 100 as it is further positioned in response to variances in roller speed between full speed and stopped adjacent the transfer station.

Similarly, the illustration in FIG. 5 reflects the varying positions of the panel or batch here designated by the numerals 200—200f as the panel or batch is moved adjacent the transfer station in response to variances in the speed of rotation of the groups of rollers in the conveyor of the invention.

The use and operation of the invention are as follows:

The panel or batch 2 of panels moves along the conveyor 1 and a leading edge of the batch 2 will trip or actuate appropriate control switches, such as those indicated schematically, for example, at 300. Through suitable circuitry (not shown), the switches 300, of appropriate number and location, will actuate clutch members such as those shown at 301, for example, and drive means 46—47a to vary the speed of groups of rollers.

Thus, for example, the leading edge of the batch 2 will strike the first-in-line sensor or switch 300 to increase the speed of the rollers receiving the batch 2 for a predetermined length of time, e.g. 8.5 seconds. This increased roller speed will move the batch 2 rapidly forward on conveyor 1 and away from following panels or batches 2.

Within a lesser period of time, e.g. 1 second, a first clutch 301 will disengage and some of the rollers, for example those shown at I, II as shown in the left-hand portion of FIG. 1, will be reduced to a slower than normal speed. Within a second predetermined period of time, e.g. 5 seconds, a second clutch 301 disengages and subsequent rollers, for example those shown at III, IV and V in the left-hand portion of FIG. 1, will be reduced to said slower speed.

When the panel or batch 2 arrives at its position in alignment with the transfer mechanism 4, the initial predetermined period, e.g. 8.5 seconds, will have expired. At this point the drive connection with rollers subsequent to the roller indicated at V in the left-hand portion of FIG. 1, i.e. rollers VI—XXXIV for example, will come to a complete stop. The timer mechanism (not shown) or a sensor 300 may then trigger operation of the clamping mechanism illustrated in FIGS. 6 and 7, whereby the cylinder 9 produces a downward movement of arm 26 and the panel or batch 2 is gripped. Thereupon, through suitable timing mechanism, the drum 5 is rotated to lift the panel or batch 2 from the conveyor 1, to rotate the panel or batch 2 and to deposit within a predetermined period of time, e.g. 10 seconds, the panel or batch 2 on the rollers 3a of conveyor 3. Since the rollers on opposite sides of the conveyor station 4 are individually supported on stanchions 18, it will be understood that space is thus provided for passage between said rollers of the arms 21,26 of the transfer mechanism 4. The arms 21,26 are opened by suitable trip mechanism (not shown) when the panel or batch 2 is deposited on the rollers of group 3a. Said rollers will be stopped at the time of delivery of the panel or batch 2 thereon. When the arms 26,21 have opened, the aforementioned timer mechanism will connect the drive elements through appropriate clutches, such as those shown at 301 for example, to initiate rotation of said rollers at a predetermined slower-than-normal speed to convey the batch or panel 2 along conveyor 3 and away from transfer station 4.

The arms 26,21 will remain in position relative to the rollers of group 3a for a predetermined period, e.g. 40 seconds, to insure that the batch or panel 2 has entirely left the rollers aligned with transfer station 4. Thereupon the batch or panel 2 may contact an appropriate sensor or switch 300 to initiate return of the transfer mechanism to position arms 21,26 in batch-receiving position with respect to conveyor 1. Thereafter the foregoing sequence is repeated.

It will be understood that the batches or panels 2 may be placed in sequence on the conveyor 1 at such spacing as to correlate with the timing sequences described above and that said timing sequences may be varied in relation to the desired speed of production, spacing of panels or batches, etc.

In essence, the panel or batch 2 is placed on an upstream segment of conveyor 1. In response to the position of the batch or panel 2 as it moves along conveyor 1, the rollers of said conveyor are selectively increased and decreased in speed to insure separation of sequential batches or panels, the safe, assured halting of the batches or panels in alignment with the transfer mechanism 4, the safe lifting and rotation of the batch or panels from conveyor 1 and the deposit thereof on a set of quiescent rollers of the receiving conveyor. The transfer mechanism is capable of transferring a batch of panels of individual varying sizes and configurations. The batch or panel is then safely moved out of alignment with the transfer station and along conveyor 3, the rollers of conveyor 3 being varied in speed in response to the position of the batch or panel thereon and through contact of the batch or panel with suitable sensors 300, it being understood that the rollers and groups of rollers in conveyor 3 are varied in speed in order to return the batch or panel 2 to its normal conveying speed within a reasonable distance from the transfer station 4. Thus the total conveying structure will be operated at its normal, overall speed even though the normal speed is increased and then decreased upstream of the transfer station and is decreased and then increased downstream of the transfer station.

We claim:

1. A conveyor-transfer assembly for glass panels including a first conveyor, a second conveyor spaced from and adjacent said first conveyor, a transfer mechanism between said first and second conveyors, said transfer mechanism having clamp members positionable above and below the conveying surface of said first conveyor, means for closing said clamp members to grasp a panel on said surface, said mechanism including means for rotating said clamp members about a horizontal axis to deposit said panel on said second conveyor, said closing means including a slidable connection between said clamp members, brackets carried by one of said clamp members, an arm pivoted adjacent said one clamp member, and rollers carried by said arm and movable in said brackets in response to pivoting of said arm to move said one clamp member toward the other of said clamp members.

2. The structure of claim 1 characterized by and including fluid motor means and linkage connecting said fluid motor means to said arm to pivot it.